3,690,926
POLYESTER FIBRES COATED WITH AN N-GLYCIDYL COMPOUND EMBEDDED IN A RUBBER MATRIX

Matthias J. Wampetich and Wolfgang Griehl, Chur, Grisons, Switzerland, assignors to Inventa AG, Zurich, Switzerland
No Drawing. Filed June 11, 1970, Ser. No. 45,548
Int. Cl. B32b 27/02, 27/06; B60c 9/02
U.S. Cl. 117—77        11 Claims

ABSTRACT OF THE DISCLOSURE

The treatment of polyester fibres with N-glycidyl compounds to improve the adhesion of the polyester to a rubber matrix.

---

The present invention relates to a process for improving the adhesion of polyester, in particular polyester fibres, to rubber. It also relates to polyester fibres with improved adhesion to rubber and to the use of the yarns, woven fabrics and also "nonwovens" consisting thereof in rubber-coated materials, in particular in the form of tyre cord, and also as an industrial product, to rubber-coated polyester material or polyester material worked into rubber which has an improved rubber-adhesion.

For some length of time, synthetic high-polymer fibres, yarns and woven fabrics have been used for producing rubber-coated materials, for example in driving belts, hoses, hollow bodies, etc., but in particular for producing cord for tyres. It is precisely for this field of use that the application of synthetic polymers obtrudes itself on the mind, because after all these materials have high strengths. Furthermore, it is readily possible to adjust the properties of extensibility of suitable yarn already during the manufacture thereof to the values required for said purpose. However, the fundamentally very poor adhesion of yarns of synthetic macromolecular substances to rubber has always caused considerable difficulties in the incorporation thereof in rubber.

The specially valued properties of polyester, such as, for example, low water-absorbing capacity, high melting point colourlessness, resistance to the majority of chemicals, high tensile strength, good dimensional stability, and especially also the steeper stress-strain graph in comparison with polyamides, such as nylon, and, associated therewith, the reduced tendency to stretch in comparison with these materials when subjected to rather long and pronounced stress as well as high temperatures, have led to attempts to incorporate polyester as cord in rubber. It has been found, however, that the adhesion of polyester to rubber is even poorer than that of other polymeric substances, such as, for example, the polyamides.

The problem of poor adhesion to rubber has now practically speaking been solved in the case of cellulose acetates and polyamides, in particular nylon, by treating cord or woven cord fabric manufactured from these materials, prior to incorporation in the rubber, with a so-called "dip," which impoves the adhesion to rubber. Such dips are aqueous dispersions, so-called dipping baths, which contain mixtures of resorcin-formaldehyde precondensates and latex. They are the treating agents used most frequently for nylon for improving the adhesion to rubber.

It has been found, however, that an adequate adhesion to rubber cannot be obtained for polyester cord material with the dipping baths and methods of treatment suitable for polyamide. To improve the adhesion of polyesters to rubber, either other treating agents must be employed or else a preliminary treatment must be carried out prior to the application of the above-mentioned agents which are customarily employed for polyamide cord. Thus, for instance, a process is known in which polyisocyanate, more particularly triphenyl isocyanate, admixed if necessary with rubber solutions, is applied to the cord yarn or woven cord fabric. As is known, however, the isocyanates are very sensitive to moisture and this limits their durability accordingly. Furthermore, these compounds must be used in organic solution. Because of the combustibility, danger of explosion and poisonousness of the appropriate solvents, working with them is not possible without taking special precautions and this makes the process complicated and increases its cost.

Moreover, methods of improving the adhesion of polyesters to rubber are known in which a two-bath process is used, i.e., two different treating agents are applied in two separate treatment baths. One of such known processes is operated in the first bath with a treating agent which consists of ten constituents and in the second bath with an agent consisting of more than five constituents. It is obvious that a process of this kind is troublesome and costly.

Furthermore, as is known, the adhesion of polyester to rubber can be improved by treating the filaments to be employed for making tyre cord, the cord yarn or the woven cord fabric in a first operation with an aqueous solution containing diglycide ether and heterocyclic or aliphatic amine and in a second operation with a bath based on resorcin-formaldehyde precondensate and latex.

Another known process for improving the adhesion of polyester to rubber consists in that a diglycide ether of a low aliphatic diol and a heterocyclic or aliphatic amine are applied simultaneously with the spinning preparation to the filaments intended for making tyre cord, following which, in a second stage, the treatment with resorcin-formaldehyde precondensate and latex is carried out. In a first stage of this process, the polyester is brought simultaneously into contact with the two active substances improving the adhesion to rubber and with the spinning preparation on a spinning preparation roll and its rubber-accepting properties are influenced in this way. There are drawbacks attaching to this process, however, since a plurality of active substances improving the adhesion to rubber must always be applied in this case. Moreover, it is apparent from what is already known that the simultaneous application of spinning preparation and the various active substances improving the adhesion to rubber, which alone achieves the elimination of one step, is possible only with the above-mentioned combinations of diglycide ether of lower aliphatic dialcohols and heterocyclic or aliphatic amines, since hardening of the cord yarn or woven cord fabric occurs with all the other known treating agents.

Surprisingly, it has been found that the adhesion of polyester fibres to rubber can be improved by treating them with one or more spinning preparations and, if necessary, subsequent treatment with a resorcin-formaldehyde-latex bath by employing spinning preparations of which at least one contains an N-glycidyl compound or a mixture of these N-glycidyl compounds.

Basically suitable as N-glycidyl compounds are all nitrogen compounds containing at least one N-bound

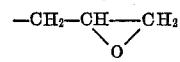

group. Such compounds can be derived, for example, from primary and secondary aliphatic, cycloaliphatic araliphatic, aromatic and cyclic mono- and polyamines. Moreover, from amides, namely carbo- and sulphoamides, and lactams, imides including urea, thiourea, guanidine, biuret, melamine, urethanes, etc., aromatic amines such as: -phenyl amines, wherein the phenyl radical may be substituted with -lower alkyl (1–4 carbons), -halo (-chloro, -bromo, etc.), -hydroxyl, plural amino groups, -thio, -phenyl, -carboxylic, and combinations thereof, and aliphatic amines and polyamines such as: the primary and secondary -lower alkyl (2–10 carbons) and various isomers; -alkanol (2–10 carbons); -cycloalkyl (4–10 carbons) and -alkylene (3–10 carbons) wtih or without suitable substitutions.

Examples of suitable N-glycidyl compounds are, in particular -hexylamines, -amylamines, -propylamines, isomers of all the known N,N-bis-glycidyl-butylamines, N,N,N'-N'-tetra-glycidyl-tetramethylendiamine, -1,2 - propylenediamine, -1,3 - propylenediamine, -hexamethylenediamine; N,N,N',N'; N,N,N',N' - tetraglycidyl - 3 - ethylamino-3, 5,5 - trimethylcyclo-hexylamine; N,N,N',N' - tetraglycidyl - (1,3- and 1,4-bis-aminoethyl)-benzene and commercial mixtures; N,N-bis-glycidyl-phenylamines substituted with alkyl, -halo, -hydroxyl, - carboxylic groups such as: -toluidine, -p-chloroaniline, etc.; N,N,O-triglycidyl-m- and -p-aminophenol; N,N,N',N'-tetraglycidyl-m- and -p-phenylenediamine; N,N,N',N'-tetraglycidyl - 2,2-bis-(p-aminophenyl)-propane; N,N,N',N' - tetraglycidyl-benzidine; N,N-glycidylbenzoic acid amide; N,N-bis-glycidylbenzenesulfonic acid amide; N,N,N',N'-tetraglycidyl-sulphanilic acid amide; N,N,S-triglycidyl - m- and -p-aminothiophenol, N,N-bis-glycidylacrylic acid amide; N-glycidylcaprolactam; N,N,N',N' - tetraglycidyl-urea, -thiourea, -guanidine, -biuret; N,N,N',N',N'',N'' - hexaglycidylmelmaine; N,N,O - triglycidyl-aminoethanol, aminoethanol, -aminopropanol; N,O,O'-triglycidyldiethanolamine; N,N-bis-glycidylaminoacetic acid glycide ester; N,N,N'-triglycidyl-p-phenylenediamine, -benzidine; N,N'-bis-glycidyl-hexamethylenediamine; N,N' - bis-glycidyl-cyclohexylamine; N-glycidylarylenediamines in particular; N,N,N',N' - tetraglycidyl-arylenediamines, such as N,N, N',N' - tetraglycidyl-p-phenylenediamine, have so far proved to be the most effective N-glycidyl compounds.

Basically, there may be used as polyesters all those that are known or conceivable. Particularly suitable are polycondensation and copolycondensation products of organic bifunctional acids with organic dihydroxy compounds, possible bifunctional acids being in particular dicarboxylic acids of the aliphatic, aromatic, cycloaliphatic or aromatic-aliphatic series, especially succinic, sebacic, phthalic and terephthalic acid or naphthalenedicarboxylic acids, and possible dihydroxy compounds being all known and conceivable diols, for example aliphatic, cycloaliphatic, aromatic or aromatic-aliphatic dihydroxy compounds, such as ethylene, propylene, butylene or hexylene diols, hydroquinone or cyclohexanedimethylol. Polyglycol esters and ether-esters of terephthalic acid are preferred.

As is known, the filaments are formed by spinning the polyester melt. In the process, it is usual, before further working-up such as reeling, stretching, twisting, etc., is carried out, to lead the freshly spun filaments over a spinning preparation roll by means of which a spinning preparation is applied to the filaments. This treatment with the spinning preparation is necessary in order to smooth the bundle of fibrils, i.e., the filament, which consists of a number of fibrils, remove antistatic charges, produce a good contact between the filaments and improve the frictional conditions, so as to make the further processing steps possible.

Emulsions of paraffin fats or oils with water and emulsifying agents are generally employed as spinning preparations. Thus, for example, the commercial product Limanol ZH (registered trademark of Messrs. Schill & Seilacher, Boblingen, Federal Republic of Germany) is a spinning preparation material formed from paraffin oil and emulsifiers unaffected by temperature which is used in concentrations of about 15 to 25 percent by weight in water as a spinning preparation for melt-spun polyethylene terephthalate.

Of course, other known spinning preparations which are usually applied in the spinning of polyester and which are miscible with the active substance improving the adhesion to rubber or with solutions of this substance, which is the case without any trouble with the usual known spinning preparations, can be employed in the present process.

The treatment according to the invention of the polyester fibres with said spinning preparation is effected in the same way in the present process, the only difference being that in this case the spinning preparation also contains N-glycidyl compounds. Thus, according to a preferred form of the process according to the invention, the N-glycidyl compounds are applied to the polyester fibres together with one of the above-described aqueous spinning preparations by means of a spinning preparation roll. It is also possible, however, to apply the N-glycidyl compounds, on the one hand, and the other constituents of the spinning preparation, on the other hand, separately, but in immediate succession and prior to the reeling operation, to the polyester fibres issuing from the spinneret or spinnerets, i.e., between the emergence of the fibre from the spinneret and the reeling, by means of two spinning preparation rolls arranged one above or after the other. Of course, the spinning preparation(s) may also be applied to the filaments in a different way.

Preferably, a spinning preparation containing N-glycidyl compounds and the other customary constituents is applied to the filaments in manner known per se by means of one and the same spinning preparation roll. Thereafter, the filaments can be stretched as usual and twisted to form a cord which may be subjected in a second stage to a treatment known per se with a bath based on resorcin-formaldehyde precondensate and latex. By application with the use of N-glycidyl compound(s), a distinct improvement in the adhesion to rubber is obtained in comparison with the known similar method of treatment (i.e., without the use of N-glycidyl compounds).

As the treatment according to the invention renders the polyester filaments neither rough, nor inflexible, nor hardening, the subsequent treatments can be carried out as usual, so that one step can be saved as compared with other processes. Moreover, all suiting to one another of a plurality of different kinds of constituents of treating agents improving the adhesion to rubber is entirely dispensed with, since as defined only one N-glycidyl compound or a mixture of (similar) N-glycidyl compounds is used. The advantages of the process according to the invention are various. As the application of an aqueous spinning preparation solution is necessary in all cases for the working-up of freshly-spun polyester filaments (reeling, stretching, forming into cord), one step is actually eliminated as compared with other processes that are known, since the application of the N-glycidyl compound(s) is effected in this very spinning preparation solution. The use of a single component or constituent, namely the N-glycidyl compound(s), the concentration of which can moreover be varied within wide limits, and the possibility of operating in aqueous solutions or emulsions furthermore brings advantages which constitute a substantial technical advance.

It is a matter of course that mixtures of N-glycidyl compounds which are in accordance with the definition can also be applied to the filaments in a completely similar manner, the mutual proportions of the individual compounds to one another not being critical. Moreover, the handling of the spinning preparations containing N-glycidyl compound(s) is extremely simple, safe and neither a fire hazard nor injurious to health, for which reasons special precautions are unnecessary. In addition, no special equipment of any kind is necessary when applying the spinning preparations containing N-glycidyl compound(s) and, since use of the compound(s) is effected with the conventional spinning preparation, one stage is actually eliminated compared with the known two-stage processes. Furthermore, the elongation at break and the tensile strength are in no way impaired by the process according to the invention.

The process according to the invention can be carried into effect in an extremely simple manner by applying the solution or emulsion of the N-glycidyl compound(s) to the freshly-spun filaments by means of a spinning preparation roll and applying one of the known and conventional spinning preparations immediately thereafter by means of a second such roll. Of course, unless two spinning preparation rolls are provided, it is also possible to add the N-glycidyl compound directly to one of the spinning preparations that are usually employed for polyesters and carry out the application of this compound and the remaining constituents of the preparation simultaneously to the freshly-spun filaments by means of the one available roll, which is preferred.

The concentration of the N-glycidyl compound(s) is variable within wide limits. Even concentrations of 1 to 3 parts by weight of active substance to 100 parts by weight of solution to be applied result in appreciably improved properties of adhesion to rubber. The upper limit of concentration is determined from the economic point of view and may be over 100 parts on the above basis. The most favourable conditions are obtained in the range of concentration between 2 and 50 percent by weight, referred to the total spinning preparation. The amount of the N-glycidyl compound per 100 parts of the finished polyester may range from 0.05 to 2 parts.

The preparation of the N-glycidyl compound(s) employed in the spinning preparation is carried out in conventional manner by reacting the corresponding primary or secondary N-compounds with epihalohydrins, such as epichlorohydrin, and subsequent alkaline treatment (see A. M. Paquin, Epoxydverbindungen und Epoxydharze, Springer Verlag, Berlin, Gottingen, Heidelberg (1958), p. 367 et seq.). The following examples illustrate the invention without, however, limiting the same.

EXAMPLE 1

Comparative example (without N-glycidyl compound)

Polyethylene terephthalate (100 parts) in the form of granules, so-called chips, is spun from the melt in known manner into filaments with a count of 5000/200, carried over a spinning preparation roll which is charged with the spinning preparation Limanol ZH (15% by weight in water), but without any addition of N-glycidyl compound for improving the adhesion to rubber, and thereby loaded with 1.2 parts of the spinning preparation and is then reeled. The filaments are stretched in known manner at elevated temperature, worked up into a cord yarn and then carried through a bath based on resorcin-formaldehyde-latex. The latexing mixture applied in this way to the yarn is dried on at about 150° C. and then fixed at about 200° C. The cord yarn treated this way is now vulcanized into a conventional rubber compound for carcasses. The force that is required per unit of area of contact between the rubber and the polyester treated in this way in order to pull the cord yarn out of the rubber bond is thereupon measured by the well-known U test. The test is carried out by fixing the rubber compound and applying to the cord yarn a pull of which the value can be measured. The force which is employed and measured per unit of area so that the cord is torn out of the rubber bond serves as a measure of the adhesion between the rubber and the cord yarn.

EXAMPLES 2–4

Polyester is spun as in Example 1. In addition to the Limanol ZH, however, the spinning preparation is charged, in accordance with Table 1, with the N-glycidyl compound improving the adhesion to rubber. The reeling and the further steps of procedure are carried out in accordance with Example 1. No hardening of any kind of the polyester filaments occurs and the stretching is carried out in the usual way. The values obtained for the strength of adhesion to rubber, which are determined similarly to Example 1 by the well-known U test, are given in Table 1.

TABLE 1

| Example | Active substance | Spinning preparation | Parts | Adhesion to rubber, kg./cm.² |
|---|---|---|---|---|
| 1 |  | Limanol ZH [1] | 3 | 23 |
|   |  | Water | 17 |  |
| 2 | N-glycidyl phthalimide | | 1 | |
|   |  | Limanol ZH [1] | 3 | 30 |
|   |  | Water | 16 |  |
| 3 | N,N'-bisglycidylpiperazine | | 2 | |
|   |  | Limanol ZH [1] | 3 | 32 |
|   |  | Water | 15 |  |
| 4 | N,N,N',N'-tetraglycidyl-p-phenyl, diamine. | | 1 | |
|   |  | Limanol ZH [1] | 3 | 44 |
|   |  | Water | 16 |  |
| 5 | N,N,-bisglycid,1-ϵ-aminocapronic acid glycidyl ester. | | 1 | |
|   |  | Limanol ZH [1] | 3 | 35 |
|   |  | Water | 16 |  |
| 6 | N,N-bisglycidyl-p-aminobenzoic acid glycidyl ester. | | 1 | |
|   |  | Limanol ZH [1] | 3 | 42 |
|   |  | Water | 16 |  |
| 7 | N,N,O-triglycidyl-p-aminophenol | | 1 | |
|   |  | Limanol ZH [1] | 3 | 43 |
|   |  | Water | 16 |  |

[1] Registered trademark of Schill & Seilacher, Böblingen, Federal Republic of Germany

EXAMPLES 5–9

Polyester is spun from the melt as in Example 1, carried over a spinning preparation roll and moistened in so doing with the N-glycidyl compound to improve the adhesion to rubber (in accordance with Table 2), treated immediately thereafter with the conventional spinning preparation Limanol ZH and reeled. The further steps of procedure are carried out in accordance with Example 1. No hardening of any kind of the polyester filaments occurs and the stretching is carried out in the usual way. The values obtained for the strength of adhesion to rubber, determined similarly to Example 1 by the well-known U test, are given in Table 2.

TABLE 2

| Example | 1st roll active substance | Parts | 2d roll spinning preparation | Parts | Adhesion to rubber, kg./cm.$^2$ |
|---|---|---|---|---|---|
| 5 | {N,N-bis-glycidyl-aniline / Methylglycol} | 1 / 19 | {Limanol ZH [1] / Water} | 3 / 17 | 30 |
| 6 | {N,N-bis-glycidylbenzenesulphonamide / Methylglycol} | 1 / 9 | {Limanol ZH [1] / Water} | 3 / 17 | 30 |
| 7 | {N-glycidyl phthalimide / Water} | 1 / 9 | {Limanol ZH [1] / Water} | 3 / 17 | 31 |
| 8 | {N,N,N',N'-tetraglycidylhexamethylenediamine / Methylglycol} | 1 / 9 | {Limanol ZH [1] / Water} | 3 / 17 | 33 |
| 9 | {N,N,N',N'-tetraglycidyl-p-phenylenediamine / Methylglycol} | 1 / 19 | {Limanol ZH [1] / Water} | 3 / 17 | 41 |

[1] Commercial product (registered trademark of Schill & Seilacher).

EXAMPLE 10

(Comparative example)

Polyethylene terephthalate (100 parts) in the form of granules is spun from the melt in known manner into filaments with a count of 5000/200. The filaments obtained in this way are thereafter treated by means of a spinning preparation roll which is charged with Limanol ZH (15% by weight in water), but without any N-glycidyl compound(s) for improving the adhesion to rubber, and then reeled. The filaments are stretched in known manner at elevated temperature and are worked up into a cord yarn. This is vulcanized in a conventional rubber compound for carcasses. The adhesion to the rubber is determined by the well-known U test; this adhesion is only 10.7 kg./cm.$^2$.

EXAMPLE 11

Polyester is spun from the melt in accordance with Example 10, the filaments being charged by means of a spinning preparation roll with a spinning preparation of the composition:

|  | Parts by weight |
|---|---|
| N,N,N',N'-tetraglycidyl-p-phenylenediamine | 1 |
| Limanol ZH | 3 |
| Water | 16 | and being finally reeled.

The further processing of the filaments is effected as indicated in Example 10. The stretching and the working-up into cord yarn are carried out in the usual manner without hardening or inflexibility of the polyester yarn occurring. The adhesion to rubber is determined by the well-known U test; it is 28.6 kg./cm.$^2$.

We claim:

1. A polyester-rubber product comprising polyester fibres coated with at least 1 part per 100 parts polyester of an N-glycidyl compound embedded in a rubber matrix.

2. The product of claim 1 wherein the N-glycidyl compounds are selected from the group of mono- and poly-N-glycidyl compounds of aliphatic, cycloaliphatic, araliphatic, aromatic and cyclic amines, imides and amides.

3. The product of claim 1 wherein N,N,N',N'-tetraglycidyl-arylenediamines are employed as said N-glycidyl compound.

4. The product of claim 1 wherein N,N,N',N'-tetraglycidyl-p-phenylenediamine is employed as N-glycidyl compound.

5. The product of claim 1 wherein N,N,N',N'-tetraglycidyl-arylenediamines are employed as said N-glycidyl compounds.

6. The product of claim 1 wherein N,N,N'N'-tetraglycidyl-p-phenylendiamine is employed as N-glycidyl compound.

7. The product of claim 1 wherein the fibres are formed into cord yarns and embedded in a rubber tire carcass.

8. The product of claim 1 wherein N-glycidyl-arylenediamines are employed as said N-glycidyl aromatic amines.

9. The product of claim 1 wherein the N-glycidyl-arylenediamines are selected from the group consisting of N,N,N',N'-tetraglycidyl-p - phenylenediamine, -m-phenylenediamine, N,N,N'-triglycidyl-p-phenylenediamine, -benzidine.

10. The product of claim 1 wherein said aliphatic amines are selected from lower alkyl amines, lower alkylene diamines, cycloalkyl amines and alkanol amines.

11. The product of claim 1 wherein said aromatic amines are selected from the group of phenylamines, wherein the phenyl radical may be substituted with a group selected from those consisting of -lower alkyl, -halo, -hydroxyl, -amino, -thio, -phenyl and -carboxylic.

References Cited

UNITED STATES PATENTS

| 3,497,556 | 2/1970 | Lanner et al. | 117—139.5 CQ |
| 3,424,609 | 1/1969 | Carl et al. | 117—139.5 CQ |
| 3,297,468 | 1/1967 | Macura et al. | 117—138.8 F |
| 3,247,043 | 4/1966 | Cardina et al. | 8—115.5 |
| 3,383,242 | 5/1968 | Macura et al. | 117—138.8 F |
| 3,449,200 | 6/1969 | Kalafus et al | 117—138.8 F |
| 3,464,878 | 9/1969 | Schwarz | 117—138.8 F |
| 3,533,460 | 10/1970 | Kiley | 117—138.8 F |
| 3,549,740 | 12/1970 | Schwarz. | |

MURRAY KATZ, Primary Examiner

M. SOFOCLEOUS, Assistant Examiner

U.S. Cl. X.R.

117—80, 138.8 F, 139.5 CQ; 161—231; 260—873